W. A. Wood,
Mower.
No. 35,558
Patented June 10, 1862.
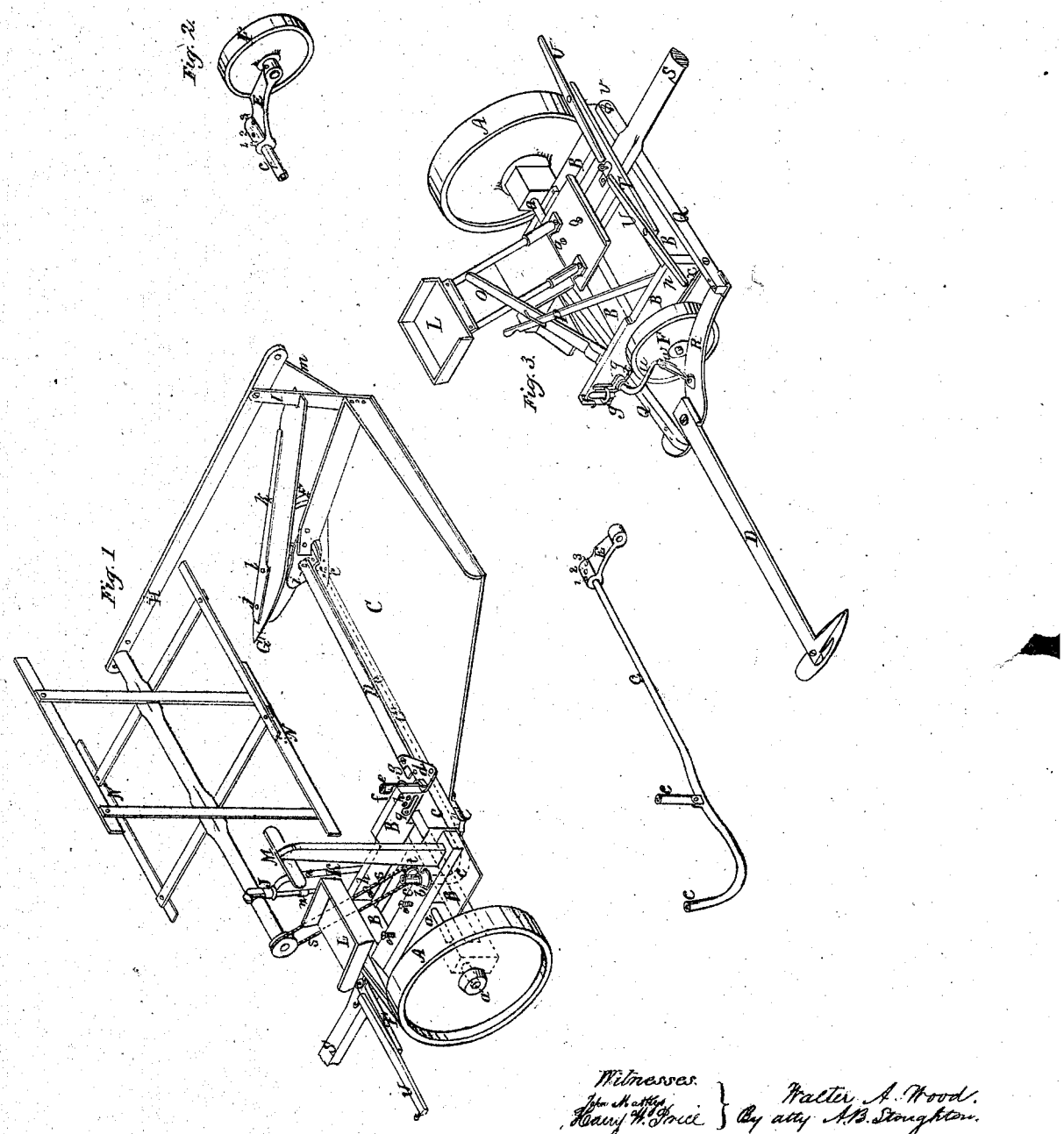
Witnesses
John Mattley
Harry W. Price
Walter A. Wood
By atty A. B. Stoughton

UNITED STATES PATENT OFFICE.

WALTER A. WOOD, OF HOOSICK FALLS, NEW YORK.

IMPROVEMENT IN HARVESTERS.

Specification forming part of Letters Patent No. 35,558, dated June 10, 1862.

*To all whom it may concern:*

Be it known that I, WALTER A. WOOD, of Hoosick Falls, in the county Rensselaer and State of New York, have invented certain new and useful Improvements in a Combined Reaping and Mowing Machine; and I do hereby declare that the following is a full, clear, and exact description of the same, reference being had to the accompanying drawings, making a part of this specification, in which—

Figure 1 represents the machine as arranged for cutting grain. Fig. 2 represents a portion of the machine not distinctly seen in Fig. 1. Fig. 3 represents the machine as arranged for cutting grass.

The sickle, sickle-bar, guards, and driving-gear are omitted in the drawings. They may be of any of the known kinds and readily supplied by any mechanic.

The object of my invention is to make a harvesting-machine easily convertible from a reaper to a mower, or vice versa, and capable of being made rigid for reaping grain, and flexible for cutting grass, and well balanced with two persons, or with one person only, riding upon the machine, as the case may be; and my invention consists in the manner in which I unite the finger-bar and platform to the main frame, so that they may be adjusted as to height thereon; and my invention further consists in the devices by which the outer end of the platform and finger-bar are raised up and lowered, and by which the point of the outside reel-supporter is raised and lowered.

To enable others skilled in the art to make and use my invention, I will proceed to describe the same with reference to the drawings.

A represents a main driving and supporting wheel, arranged upon an axle, $a$, that turns with the wheel. Upon this axle $a$ is supported a short main frame, B, that carries or sustains the several parts of the machine.

When the machine is arranged for cutting grain, as shown in Fig. 1, the platform C and the finger-bar D are united to the main frame by a bent bar or rod, $c$, which, for the sake of lightness with strength, may be made of pipe. This bar or rod $c$ has its end $c'$ bent up vertically, and it may pass through a boss or socket, $b$, and be secured by a pin passing through one of its several adjusting-holes. The platform C is connected to a platform-bar, C', and the bar or rod $c$ being let into the front of this platform-bar C' about one-half of its diameter, screws or bolts may be passed through horizontally to firmly hold them together. A plate, $d$, is bolted to the platform-bar, and a rod, $e$, is hinged to said plate, which rod extends upward, and, resting in a plate, $f$, fastened to the main frame, may be rigidly held there by a clip, $g$, which enters one of the several adjusting-notches in the rod, said clip being drawn up by the nuts $h$. The finger-bar D is united to this plate $d$ by one of its ends, the other end being fastened to a shoe-plate, $i$, at the outer side of the platform. At the outer end of the rod $c$ there is a crank or arm, E, which can be adjusted on the rod by means of holes 1 2 3, &c., through which, and through holes correspondingly made through the rod $c$, a pin or bolt may pass to set the arm at any suitable height on the bar. This arm E supports the outside carrying-wheel, F, and allows it to come close up behind the finger-bar, and so near the plane of the main drive-wheel as to prevent that end of the machine from dragging hard upon the team, as is the case when the outside supporting-wheel is far behind the plane of the main-frame wheel or wheels. The arm E and wheel F, by means of the above adjustment, hold up the outer end of the platform at its properly-adjusted height.

G is the outside divider. It may have a wing-board, $k$, pivoted to it at $j$, and by means of a pin and adjusting-holes at $l$ this wing-board may be set as to push the standing grain away from the machine, to prevent it from hanging thereon.

H is the outside reel-supporter. It is pivoted to the post I, and has a brace-rod, $m$, extending from its rear to the bottom of the post, and there secured, so that by a turning nut and a screw-thread on the rod the point of the reel-supporter and the reel in it may be raised or lowered without loosening the supporter or liability to lose any of the parts.

J is the inside reel-supporter. It is supported on an upright, K, and by means of a clamp, $n$, may be raised or lowered to any proper height that the reel is to work at.

L is the driver's seat, and M the raker's stand. Both of these positions are within the plane of the main wheel A, and the raker, with his back to the horses, can draw the gavel straight across the platform and drop it into the gaveling-space behind the main frame with very labor or exertion. The driver in his position about counterbalances the raker in his position, so that the main frame can be very short and almost the entire machine (except the platform) be within the plane of the drive-wheel, which makes it run easy and avoids multiplied motions or concussions.

$o$ $o$ represent the point where the driver's seat is removed to when the machine is converted into a grass-mower and the raker and his stand are removed; and $p$ represents the point where the lever-brace is attached, the lever and its arm being attached at $q$ to the main frame.

N is the reel. It is driven from a pulley, $t$, on the axle of the main wheel by means of an endless belt, $s$, passing around said pulley and around a pulley, $r$, on the end of the reel-shaft.

When this machine is to be converted from a reaping-machine, as shown in Fig. 1, to a grass-mower, as shown in Fig. 3, the finger-bar, platform, reel, and reel-supporters and raker's stand are removed with the several parts connected to them. The driver's seat L is then set back on the frame at the points $o$ $o$, and the outside supporting-wheel, F, is put on at the grain side of the main frame. The lever O is put on at the point $q$ of Fig. 1, its arm $u$ passing through the frame, as seen in Fig. 3, and the lever-brace P is put on at $p$. Two arms, Q Q, are then hung onto the journals $v$, these arms being connected by a flat bent bar, R, on which a seat for the heel of the finger-bar D is made, and where the finger-bar is fastened. There is a link, $w$, on the runner-bar R, which is hooked onto the end of the lever-arm $u$, and the machine is now converted into a grass-mower, the finger-bar of which is in the plane of the drive-wheel, and is free to rise and fall in accommodating itself to the undulations of the ground. A brace-rod, $x$, may extend from the heel of the lever-arm $u$ to the front arm Q to brace it, and shall allow said arm to swing on its journal or wrist.

S is the tongue, it being a stiff one, and T the double and U the single-trees.

The bar or rod $c$ has its end bent up vertically to nearly a right angle with its length, and the part of said rod $c$ where the rod $e$ rests upon it may be made crowning or arched, so as to be higher at that point above the ground than it is at the outer or grain end thereof, the purpose of this crowning or arching being to prevent the weight of both the driver and raker from causing it to sag below a straight line.

Having thus fully described my invention, what I claim is—

1. Uniting the platform to the main frame by the bent rod $c$ and hinged rod $e$ and their appliances, so that the platform may be raised or lowered on the main frame, substantially as described.

2. The plate $d$, as forming a hinged support to the rod $e$ and a means of uniting the platform and finger-bar, substantially as described.

3. The device for raising and lowering the outer side of the platform—namely, the sleeve and its adjusting-holes on the arm or outside wheel-supporter, E, and similar adjusting-holes in the rod $c$, and a pin or key passing through them—substantially as set forth.

WALTER A. WOOD.

Witnesses:
ADW. THAYER, Jr.,
W. ANSON WOOD.